US012128645B2

(12) United States Patent
Capoia

(10) Patent No.: US 12,128,645 B2
(45) Date of Patent: Oct. 29, 2024

(54) MACHINE FOR FORMING AND PRINTING CARDBOARD BOXES

(71) Applicant: PANOTEC S.R.L., Cimadolmo (IT)

(72) Inventor: Giuseppe Capoia, Cimadolmo (IT)

(73) Assignee: PANOTEC S.R.L., Cimadolmo (IT)

( * ) Notice: Subject to any disclaimer, the term of this patent is extended or adjusted under 35 U.S.C. 154(b) by 0 days.

(21) Appl. No.: 18/027,098

(22) PCT Filed: Oct. 13, 2021

(86) PCT No.: PCT/IB2021/059411
§ 371 (c)(1),
(2) Date: Mar. 18, 2023

(87) PCT Pub. No.: WO2022/079633
PCT Pub. Date: Apr. 21, 2022

(65) Prior Publication Data
US 2023/0330960 A1 Oct. 19, 2023

(30) Foreign Application Priority Data
Oct. 13, 2020 (IT) ........................ 102020000024064

(51) Int. Cl.
*B31B 50/88* (2017.01)
*B26D 7/18* (2006.01)
(Continued)

(52) U.S. Cl.
CPC ................ *B31B 50/88* (2017.08); *B26D 7/18* (2013.01); *B31B 50/006* (2017.08); *B31B 50/16* (2017.08); *B31B 50/624* (2017.08); *B65B 11/004* (2013.01); *B31B 2105/0024* (2017.08); *B31B 2110/35* (2017.08)

(58) Field of Classification Search
CPC ....... B31B 50/88; B31B 50/624; B31B 50/16; B31B 50/006; B31B 50/20; B31B 2105/0024; B31B 2105/0027; B31B 2120/102; B31B 2110/35; B65B 11/004; B65B 5/028; B26D 7/18
See application file for complete search history.

(56) References Cited

FOREIGN PATENT DOCUMENTS

| | | | |
|---|---|---|---|
| EP | 1847397 | A2 | 10/2007 |
| WO | 2014117817 | A1 | 8/2014 |

(Continued)

*Primary Examiner* — Thomas M Wittenschlaeger
(74) *Attorney, Agent, or Firm* — Themis Law

(57) ABSTRACT

A machine for forming and printing cardboard boxes, each box including a bottom wall, two pairs of side walls and a closing wall, the machine includes supply means for supplying a continuous web of cardboard, first cutting means for cutting the continuous web, that are adapted to form an elongate element with upper and lower surfaces, second cutting and creasing means for forming, in the elongate element, a first panel configured to define the first pair of side walls, the bottom wall and the closing wall, and second and third separate panels configured to define the second pair of side walls of the box. The machine also includes printing means interposed between the first cutting means and the second cutting and creasing means. The printing means have at least one lower and upper printing unit, adapted to print on the lower and upper surfaces of the elongate element respectively.

11 Claims, 6 Drawing Sheets

(51) Int. Cl.

| | |
|---|---|
| ***B31B 50/00*** | (2017.01) |
| ***B31B 50/16*** | (2017.01) |
| ***B31B 50/62*** | (2017.01) |
| ***B65B 11/00*** | (2006.01) |
| *B31B 105/00* | (2017.01) |
| *B31B 110/35* | (2017.01) |

(56) References Cited

FOREIGN PATENT DOCUMENTS

| | | | | | |
|---|---|---|---|---|---|
| WO | 2017077439 | A1 | | 5/2017 | |
| WO | WO-2019025955 | A1 | * | 2/2019 | ........... B31B 50/252 |

* cited by examiner

MACHINE FOR FORMING AND PRINTING CARDBOARD BOXES

TECHNICAL FIELD

The present invention generally finds application in the field of packaging and particularly relates to a machine for forming and printing cardboard boxes from a continuous cardboard web.

STATE OF THE ART

Machines have been long known for making custom-sized boxes from continuously fed cardboard webs or sheets.

Generally, these machines comprise feeding means for feeding the cardboard sheets and means for cutting and creasing the sheets in respective longitudinal and transverse directions to form a cardboard blank.

Furthermore, these machines comprise means for introducing and positioning the items to be packaged on the blank, which is then folded around the items to be packaged to form the box.

A drawback of these known machines is that they are not equipped with means for printing the outer surface of the boxes.

Therefore, the boxes are printed either by a separate printing unit configured to print the cardboard webs or sheets designed to supply the machine or manually by an operator which applies preprinted labels on the outer surface of the box, which considerably increases item processing and packaging times.

Furthermore, if printing is carried out by means of a further device, this drawback causes an increase of the overall dimensions and the construction complexity of the entire plant.

One example of these machines is known from WO2014/117817, which discloses a system for forming boxes from a continuous cardboard web and for automated packaging of items therein.

In particular, the items to be packaged in the box are placed, by hand or by suitable automatic means, on a conveyor belt which moves in a predetermined direction and has a plurality of sensors thereon, configured to control the position and the number of items to be packaged.

A zone is provided below the belt for preparation of the cardboard sheet that will form the box, in which the sheet is cut and creased based on volume measurements made on the items to be packaged. Then, the sheet so cut and creased is conveyed toward introduction means for introducing the items to be packaged.

Finally, the sheet is folded around the items to be packaged to form the side walls and the lid of the box.

A first drawback of this solution is that the system is coupled to a single printing apparatus for printing the images to be transferred to the box.

Nevertheless, this printing apparatus is not able to afford custom printing on all the outer faces of the box or to print images on both sides of each face of the box.

A further drawback is that the steps for processing the continuous cardboard web to obtain the deployed sheets to be later folded involves considerable waste of material, that cannot be reused to make further boxes.

Technical Problem

In light of the prior art, the technical problem addressed by the present invention is to achieve simultaneous forming and printing of the inner and outer surfaces of boxes, while minimizing base material waste.

Disclosure of the Invention

The object of the present invention is to obviate the above drawback, by providing a machine for forming and printing boxes that is highly efficient and cost-effective.

A particular object of the present invention is to provide a machine for forming boxes that affords automatic and synchronized box formation, item packaging and printing of the inner and/or outer surface of the box.

A further object of the present invention is to provide a machine for forming and printing boxes that has ink-jet printing means for printing the inner and outer faces of the box with high resolution to achieve high printing quality.

Another object of the present invention is to provide a machine for forming and printing boxes that can limit processing waste in the box making process.

These and other objects, as more clearly shown hereinafter, are fulfilled by a machine for forming and printing cardboard boxes from a continuous cardboard web for automatic packaging of items as defined in claim 1, with each box comprising a bottom wall, two pairs of side walls and a closing wall.

The machine comprises supply means for the continuous cardboard web, first cutting means for cutting the continuous web, that are adapted to form an elongate element with an upper surface and a lower surface, and second cutting and creasing means for forming, in the elongate element, a first panel designed to define the first pair of side walls, the bottom wall and the closing wall of the box, and second and third separate panels designed to define the second pair of side walls of the box.

Moreover, first gluing means are provided for gluing the pair of panels along the side edges of the first panel in opposed positions to form a substantially cross-shaped one-piece blank and printing means are provided for printing the outer surface of the box.

According to a peculiar aspect of the invention, printing means are provided which are configured to print on the lower surface and the upper surface of the elongate element and are interposed between the first cutting means and the second cutting and creasing means.

Advantageous embodiments of the invention are obtained in accordance with the dependent claims.

BRIEF DESCRIPTION OF THE DRAWINGS

Further characteristics and advantages of the invention will be more apparent upon reading of the detailed description of a preferred, non-exclusive embodiment of a machine for forming and printing cardboard boxes from a continuous cardboard web like the one discussed above, as shown by way of a non-limiting example with the help of the following drawings, in which.

DETAILED DESCRIPTION OF A PREFERRED EXEMPLARY EMBODIMENT

Particularly referring to the figures, there is shown a machine for forming and printing cardboard boxes B, generally designated by numeral 1, from a continuous cardboard web M for automatically packaging items O.

Generally, the continuous web M has a standardized continuous width, which may vary according to the type of items to be packaged and provided by external manufacturers.

In particular, each box B, once assembled, comprises a bottom wall $P_F$, two pairs of side walls $P_{L1}$, $P_{L2}$; $P_{L3}$, $P_{L4}$ and a closing wall $P_S$.

Advantageously, the cardboard boxes B may be of any known prismatic or parallelepiped shape, such as, for example, the box as disclosed in the International Application WO2018122756A1 by the applicant hereof.

The items O designed to be packaged inside the cardboard boxes B may be selected from different classes, without departure from the scope of the present invention.

Figure 1:
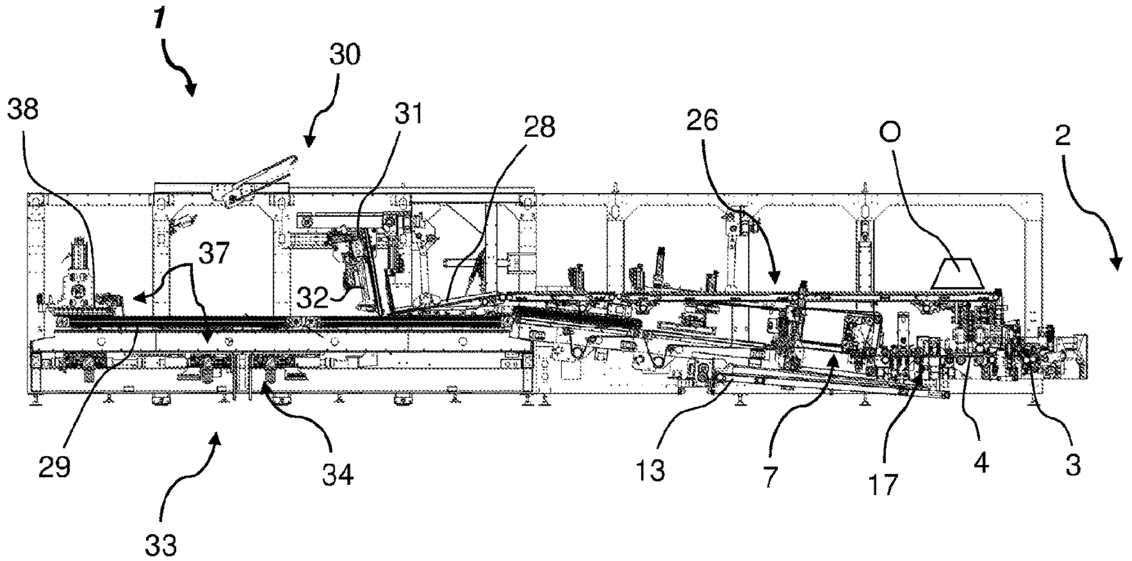
FIG. 1 is a sectioned side view of the machine of the invention.

As shown in FIG. 1, the machine 1 has a zone 2 for introducing the item/s O to be packaged and the continuous cardboard web M, and an exit zone for the formed box B.

Conveniently, supply means 3 are provided for supplying the continuous web M from a holding or storage station, not shown.

For example, the supply means 3 may be of well-known type and may comprise one or more rollers rotating about respective axes to move the web M.

In a preferred embodiment of the invention, the machine 1 comprises first cutting means 4 for cutting the continuous web M, which are adapted to form an elongate element E with an upper surface $S_U$ and a lower surface $S_L$.

The first cutting means 4 are configured to remove predetermined portions of cardboard along the peripheral edges of the continuous web M where further cuts or creases will be made at a later time.

Figure 2:
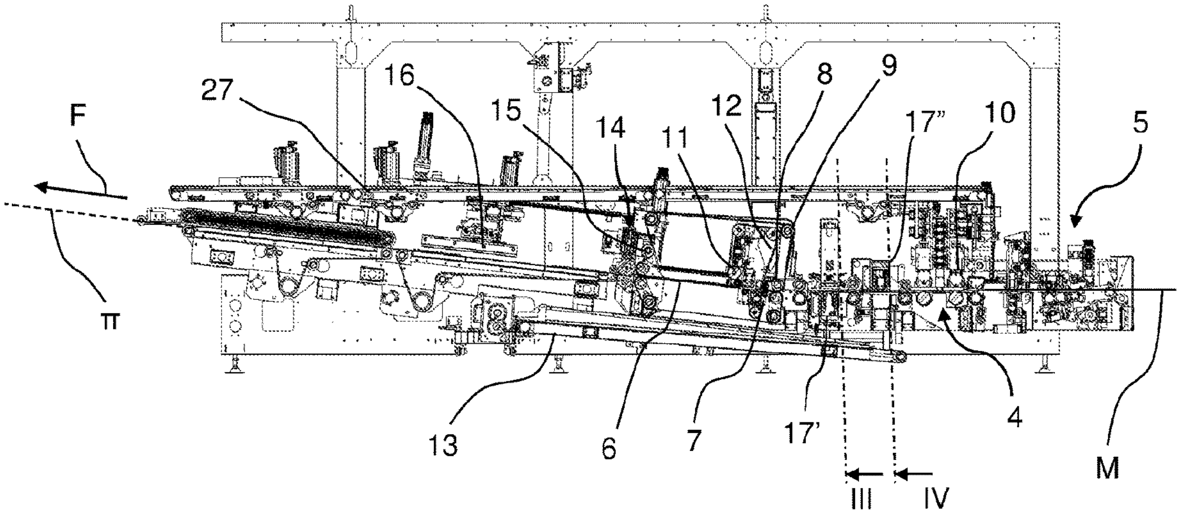
FIG. 2 is a sectioned side view of the cutting and creasing means of the machine of the invention.

As is well known, the first cutting means 4 may generally comprise at least one circular tool, as shown in FIG. 2, rotatably mounted about a substantially horizontal axis and forming part of a head installed on the machine.

The device 1 comprises feeding means 5 for the elongate element, which are adapted to feed it in a longitudinal direction as shown by arrow F, and have the lower surface $S_L$ in contact with a sliding surface.

The feeding means 5 comprise a series of first conveyor belts 6 arranged in succession and substantially inclined to the horizontal along a sliding plane $\pi$ defined by an inclined plate.

Then, the feeding means 5 receive the continuous web M from the supply means 3, carry it toward the first cutting means 4 and subsequently continuously carry the elongate element E toward a second processing unit.

This second processing unit may comprise second cutting and creasing means 7, which are intended to form, in the elongate element E, a first panel $E_1$ designed to define the first pair of side walls $P_{L1}$, $P_{L2}$, the bottom wall $P_F$ and the closing wall $P_S$, and second and third separate panels $E_2$, $E_3$ designed to define the second pair of side walls $P_{L3}$, $P_{L4}$ of the box B.

As best shown in FIG. 2, the second cutting and creasing means 7 comprise a first series of transverse tools 8 mounted to a first carriage 9, moving transverse to the feeding direction F of the continuous web M and a first series of longitudinal tools 10 adapted to form a plurality of transverse cutting and creasing lines $L_T$ on the elongate element E.

In addition, the second cutting and creasing means 7 comprise a second series of transverse tools 11 mounted to a second carriage 12 moving transverse to the feeding direction F of the elongate element E and adapted to form a plurality of longitudinal creasing lines $L_L$ thereupon.

The longitudinal creasing lines $L_L$ are formed along the entire length of the elongate element E of the first side flaps $W_1$.

The transverse cutting and creasing lines $L_T$ are designed to define, in the first panel $E_1$, the side walls $P_{L1}$ and $P_{L2}$, the bottom wall $P_F$ and the closing wall $P_S$ having a second flap $W_2$, and to separate the second and third panels $E_2$, $E_3$.

Thus, as shown in FIGS. 7-13, the elongate element E is configured to comprise in succession, from upstream to downstream with respect to the feeding direction F, the first panel $E_1$ designed to define a first side wall $P_{L1}$, the bottom wall $P_F$, a second side wall $P_{L2}$, the closing wall $P_S$, the second panel $E_2$ designed to define the third side wall $P_{L3}$, and the third panel $E_3$ designed to define the fourth side wall $P_{L4}$ of the box B.

Advantageously, an unloading belt 13 for conveying the scraps of the first cutting means 4 and the second cutting and creasing means 7, is located below the first conveyor belts 6 and designed to convey the scraps toward a shredding unit, not shown.

Therefore, the cardboard processing scraps can be removed from the machine 1, thereby avoiding jams, and recovered for reuse or disposed of as needed.

The machine 1 further comprises first gluing means 14 for gluing the pair of panels $E_2$, $E_3$ along the side edges of the first panel $E_1$ in opposed positions to form a substantially cross-shaped one-piece blank H.

The first gluing means 14 comprise a first applicator 15 for applying hotmelt glue strips on the side edges of the first panel $E_1$ and a pair of suction-cup manipulators 16 for picking up the second and third panels $E_2$, $E_3$ and applying them on the first panel $E_1$ at the glue strips to obtain the cross-shaped blank H.

Namely, the first applicator 15 deposits a strip of glue on the two side flaps $W_1$ of the bottom wall $P_F$ in the first panel $E_1$, whereas the suction-cup manipulators 16 pick up the second and third panels $E_2$, $E_3$, and cause a flap $W_1$ thereof to match with the side flaps $W_1$ of the bottom wall $P_F$ having strips of glue.

This will provide a substantially cross-shaped cardboard blank H for forming the box B which is designed to hold and package the items O.

According to a particular aspect of the invention, the machine 1 comprises printing means, generally referenced 17, interposed between the first cutting means 4 and the second cutting and creasing means 7.

Advantageously, the printing means 17 comprise at least one lower printing unit 17' and at least one upper printing unit 17" having respective lower printing heads 18' and upper printing heads 18", preferably of the ink jet type.

Figure 3:
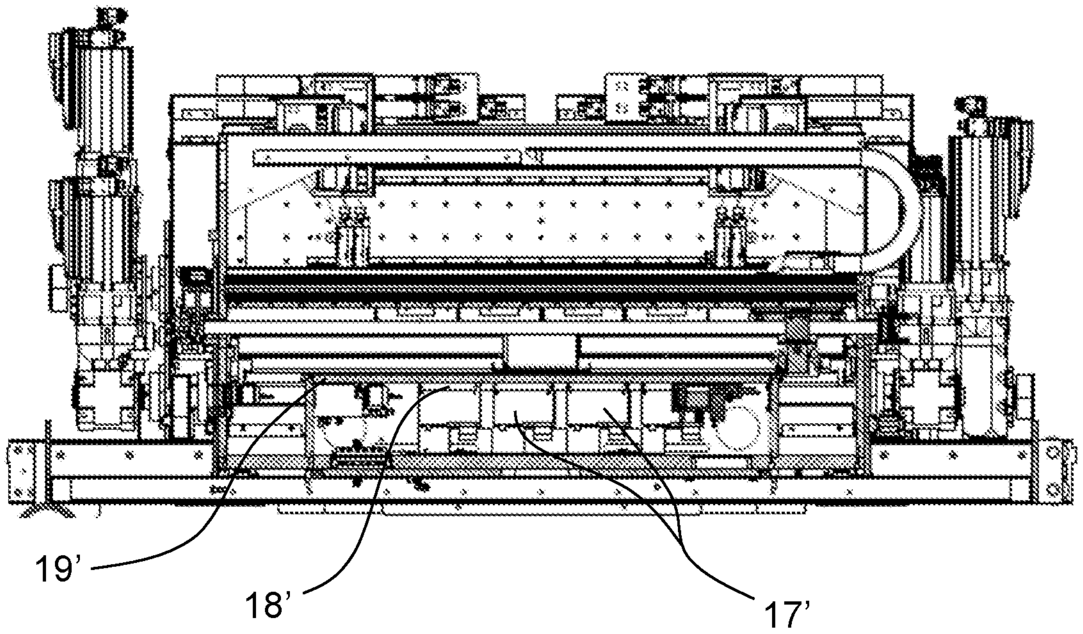
FIG. 3 is a cross section of the lower printing unit of the machine of FIG. 1.

As best shown in FIG. 3, the at least one printing head 18' is arranged below the sliding plane 7 defined by a first plate 19' for depositing the ink on the lower surface $S_L$ of the elongate element E which slides with its upper surface $S_U$ resting on the first plate 19'.

Figure 4:
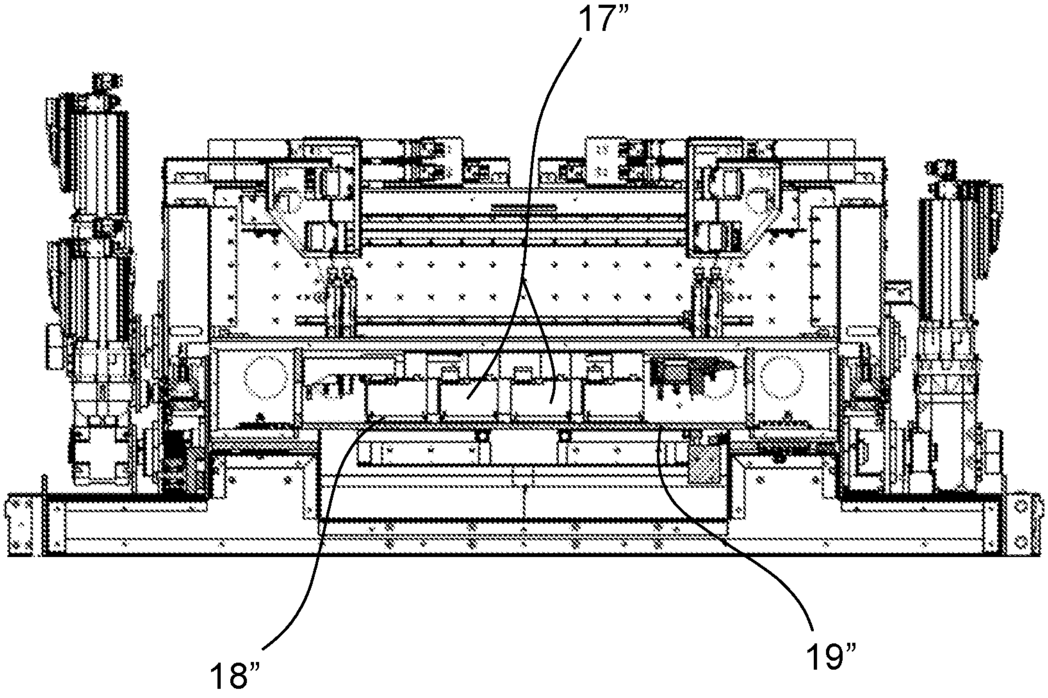
FIG. 4 is a cross section of the upper printing unit of the machine of FIG. 1.

As best shown in FIG. 4, the at least one printing head 18" is arranged above the sliding plane $\pi$ defined by a second plate 19", to deposit the ink on the upper surface $S_U$ of the elongate element E which slides with its lower surface $S_L$ resting on the second plate 19".

Then, the printing units 17', 17" are configured to print on the lower surface $S_L$ and the upper surface $S_U$ of the elongate element E.

The machine 1 comprises a microprocessor control unit (PLC), in a separate cabinet, not shown, which is designed to control the operation of the printing units 17', 17" and of their respective printing heads 18', 18" for simultaneous one-pass printing on all the walls $P_F$, $P_S$, Pu, $P_{L2}$, $P_{L3}$, $P_{L4}$ of the box B or on a predetermined number thereof, both outside and inside the box B.

Alternatively, printing can be performed on a single wall or on a predetermined number of walls by means of an appropriate setting of the PLC control unit.

Due to the peculiar characteristic of being interposed between the first cutting means 4 and the second cutting and creasing means 7, the printing units 17', 17" may effect monochrome and/or colour printing on the entire upper surface $S_U$ and/or the lower surface $S_L$ of the elongate element E which, once processed by the second cutting and creasing means 7, will form the various walls of the box B.

Figure 5:
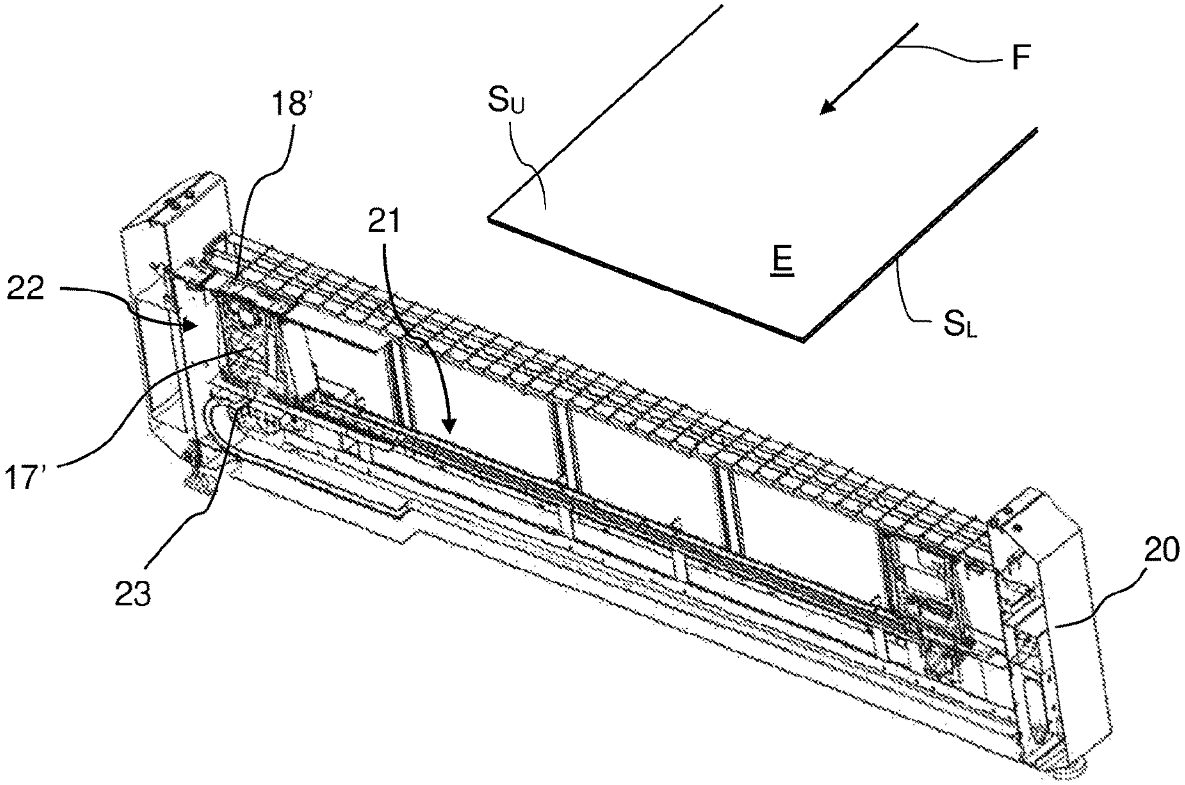
FIG. 5 is a partial perspective view of the printing unit.

In one embodiment as shown in FIG. 5, the at least one lower printing unit 17' is mounted to an elongate frame 20 extending in a direction transverse to the longitudinal feeding direction F of the elongate element E.

Preferably, at least one pair of guides 21 are provided in the lower part of the frame 20 to slidably guide at least one box-like support 22 which is configured to house therein the at least one printing unit 17' with at least one respective inkjet printing head 18'.

Optionally, in order to increase the printing speed, a plurality of supports 22 may be mounted on the guides 21 in transversely offset positions.

The support 22 is moved along the guides 21 by means of suitable drive means 23 arranged below the guides 21.

The printing unit 17" has a configuration that is similar to and substantially reversed as compared with that of the printing unit 17' and will not be described in detail.

An advantage deriving from this configuration is that once the items O to be packaged have been prepared, the necessary information, such as technical data, the address of the recipient and/or sender, logos and/or trademarks, etc., can be automatically printed on the walls of the box B, without requiring a pre- or post-packaging printing operator.

Once the substantially cross-shaped blank H has been printed and processed by the first cutting means 4 and the second cutting and creasing means 7, will be ready to receive the items O to be packaged.

In one embodiment, the machine 1 comprises conveyor means 26 for conveying the items O to be introduced into the boxes B, having a series of second conveyor belts 27 arranged above the first conveyor belts 6.

Advantageously, the first 6 and second conveyor belts 27 may be operably connected by the control unit (PLC) with software developed to synchronize the movements and check proper matching between the items O and the box B as the latter is being made.

Once the substantially cross-shaped blank H has been formed, the items O are ready to be deposited on its upper surface $S_U$.

For this purpose, the machine 1 comprises a cantilever belt 28 configured to deposit the items O on the upper surface $S_U$ of the bottom wall $P_F$ of the blank H.

The blank H that leaves the second cutting and creasing means 7 is moved by the first conveyor belts 6 toward a transfer system, for example by means of belts 29, while the items O are being positioned on its bottom wall $P_F$ by means of the cantilever belt 28.

Conveniently, the machine 1 comprises a closing station 30 for closing the blank H with the items O placed on the bottom wall $P_S$ located downstream of the cantilever belt 28.

As shown in FIG. 1, the closing station 30 may comprise a robotic arm 31 having second gluing means 32 for applying hotmelt glue on the edges of the blank H to close it firmly during the next folding steps which result in the formation of the closed box B.

Figure 6:
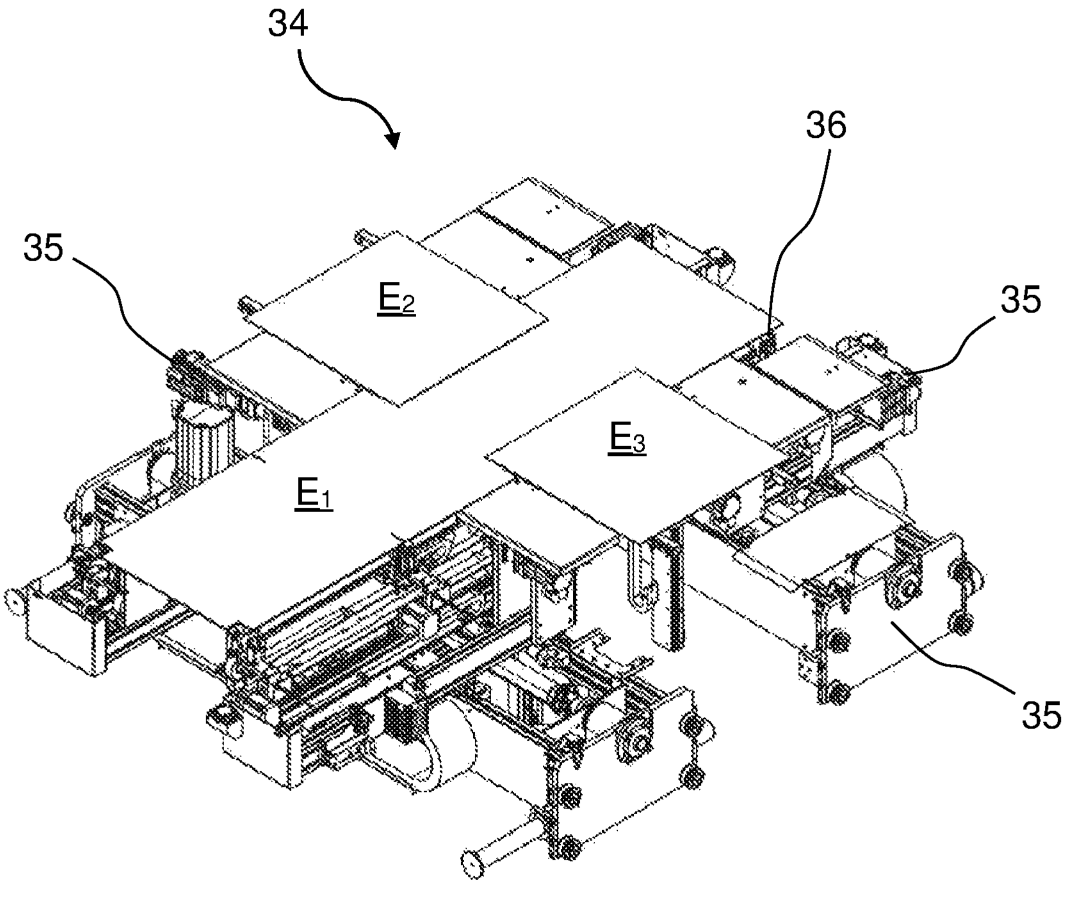
FIG. 6 is a top perspective view of a first working unit for folding the walls of a box.
Figure 7:
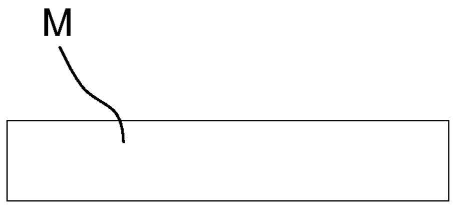
FIG. 7 is a top view of the continuous cardboard web.
Figure 8:
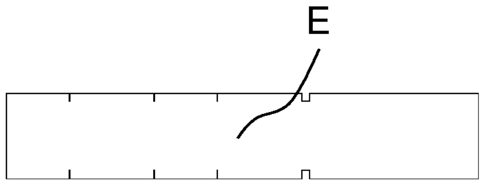
FIG. 8 is a top view of an elongate cardboard element obtained from the web of FIG. 7.
Figure 9:
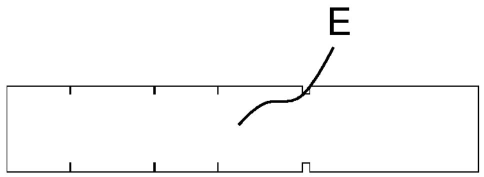
FIG. 9 is a top view of the elongate element of FIG. 8 after the step of printing on its surfaces.
Figure 10:
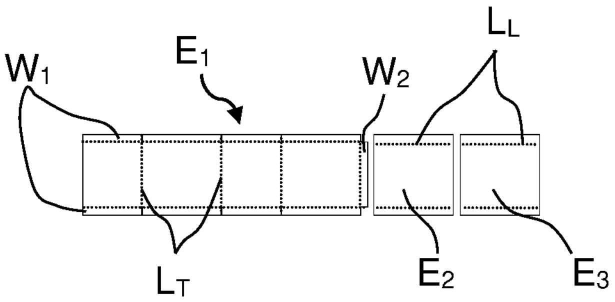
FIG. 10 is a top view of the panels obtained from the elongate element.
Figure 11:
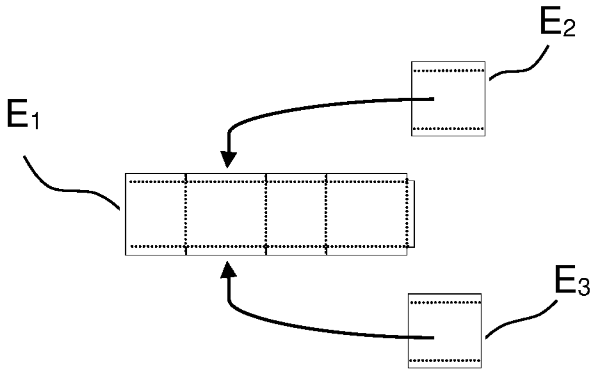
FIG. 11 is a top view of the arrangement of the panels to obtain the cross-shaped blank.
Figure 12:
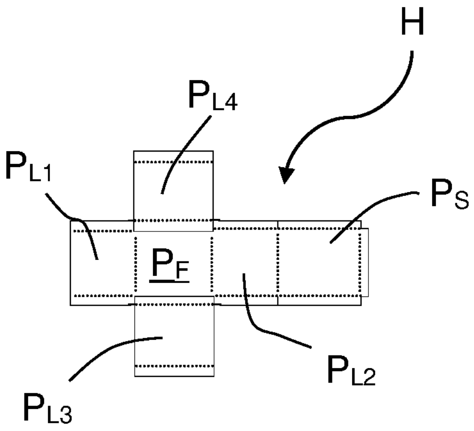
FIG. 12 is a top view of a cross-shaped blank obtained from the elongate element of FIG. 8.
Figure 13:
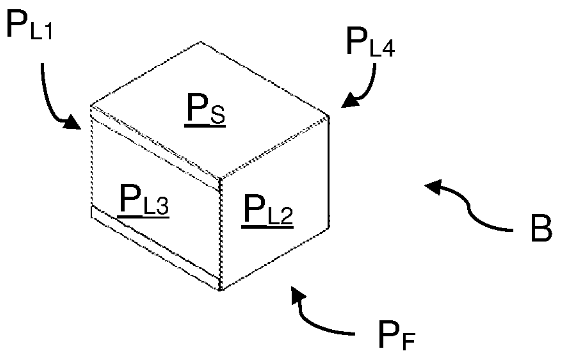
FIG. 13 is a perspective view of an assembled box obtained from the blank of FIG. 12.

Folding means 33 are provided below the belt system 29, which comprise a first group of manipulators 34, as shown in FIG. 6, having a plurality of tip-up actuators 35, each comprising a respective suction cup member 36 adapted to hold the blank H at the side walls $P_{L1}$, $P_{L3}$ and $P_{L4}$, and fold them along their creasing lines.

Conveniently, the folding means 33 comprise a second group of manipulators 37 which are designed to fold the top wall $P_S$ to close the box B at its top.

Furthermore, the second group of manipulators 37 comprises a plurality of pressing rollers 38 which are designed to promote gluing between the various flaps W to improve the stability of the box B.

The box B so closed and containing the respective items O is picked up and stored in a suitable place before being shipped.

All the main moving parts in the machine 1 are motorized and independently managed by means of the microprocessor control unit PLC, with synchronized movements.

It will be appreciated from the above that the machine of the invention fulfills the intended objects and particularly affords automatic packaging of items in appropriately printed cardboard boxes.

The machine of the invention is susceptible of a number of changes and variants, within the inventive concept disclosed in the appended claims.

While the machine has been described with particular reference to the accompanying figures, the numerals referred to in the disclosure and claims are only used for the sake of a better intelligibility of the invention and shall not be intended to limit the claimed scope in any manner.

Reference herein to "one embodiment" or "the embodiment" or "some embodiments" indicates that a particular characteristic, structure or element that is being described is included in at least one embodiment of the inventive subject matter.

Furthermore, the particular characteristics, structures or elements may be combined together in any suitable manner to provide one or more embodiments.

INDUSTRIAL APPLICABILITY

The present invention may find application in industry because it can be produced on an industrial scale in the field of packaging machines.

The invention claimed is:

1. A machine for forming and printing cardboard boxes from a continuous cardboard web for automatically packaging items, wherein each box comprises a bottom wall, first and second pairs of side walls, and a closing wall, said machine comprising:

supply means for supplying said continuous web;

first cutting means for cutting the continuous web, said cutting means being adapted to form an elongate element having an upper surface and a lower surface;

second cutting and creasing means for forming, in said elongate element, a first panel configured to define the first pair of side walls, the bottom wall, the closing wall, and second and third separate panels configured to define the second pair of side walls of the box; and printing means interposed between said first cutting means and second cutting and creasing means, said printing means having at least one lower printing unit and at least one upper printing unit adapted to print on the lower surface and the upper surface of said elongate element respectively, a microprocessor control unit being provided for controlling said at least one lower printing unit and one upper printing unit for simultaneous one-pass printing on each of the walls of the box or on a predetermined number of walls, both outside and inside the box.

2. The machine as claimed in claim 1, wherein said at least one lower printing unit and said at least one upper printing unit are equipped with at least one lower inkjet printing head and one upper inkjet printing head respectively.

3. The machine as claimed in claim 1, further comprising feeding means for feeding said elongate element in a longitudinal direction with its lower surface in contact with a sliding surface.

4. The machine as claimed in claim 3, wherein said feeding means comprise a series of first conveyor belts arranged in succession along a sliding plane.

5. The machine as claimed in claim 4, wherein at least one lower printing head is arranged below said sliding plane to deposit ink on the lower surface of the elongate element.

6. The machine as claimed in claim 4, wherein at least one upper printing head is arranged above said sliding plane to deposit ink on the upper surface of the elongate element.

7. The machine as claimed in claim 4, further comprising an unloading belt for conveying scraps of said first and second cutting and creasing means, which is located below said series of first conveyor belts.

8. The machine as claimed in claim 1, wherein each printing unit is mounted to an elongate frame extending in a direction transverse to a longitudinal feeding direction of the elongate element.

9. The machine as claimed in claim 8, wherein said elongate element is configured to comprise, in succession, and from upstream to downstream with respect to said longitudinal feeding direction, a first panel configured to define a first side wall, the bottom wall, a second side wall, the closing wall, a second panel configured to define a third side wall, and a third panel configured to define a fourth side wall of the box.

10. The machine as claimed in claim 1, further comprising first gluing means for gluing said first and second panels along side edges of said first panel in opposed positions to form a substantially cross-shaped one-piece blank.

11. The machine as claimed in claim 10, wherein said first gluing means comprise a first applicator for applying hot-melt glue strips on the side edges of the first panel and a pair of suction-cup manipulators for picking up the second and third panels and applying them on the first panel at the glue strips to obtain the cross-shaped blank.

* * * * *